United States Patent Office.

IMPROVEMENT IN THE MANUFACTURE OF ALCOHOL AND OTHER SPIRITS.

JOHN F. COLLINS, OF NEW YORK.

Letters Patent No. 59,891, dated November 20, 1866.

SPECIFICATION.

TO ALL WHOM IT MAY CONCERN:

Be it known that I, JOHN F. COLLINS, of New York, in the county of New York, and State of New York, have invented a new and useful Improvement in the Manufacture of Alcohol and other Spirits from wash, mash, or other substances, or for raising the proof of distilled spirits; and I do hereby declare that the following is a full and exact description thereof, which will enable those skilled in the art to practise and use the same:

My invention relates to the manufacture of alcohol and other spirits and volatile substances which are obtained by distillation; and it consists in several particulars as hereinafter set forth. In heating the wash or other substances from which alcohol or other spirits are distilled, I add to the wash-mash or other substances a suitable quantity of phosphate of lime, or its equivalent, for the purpose of counteracting the generation or formation of acids, and for the purpose of neutralizing any acids that may have been formed in the wash. Soda or carbonate of ammonia can be substituted for the phosphate of lime, if preferred. Another part of my invention consists in conducting the distillation of spirituous solutions at a temperature not exceeding 176 degrees Fahrenheit, for the purpose of preventing the formation of acetous and acetic acid in the mass. In obtaining the different distillates, I also keep the temperature of the solutions used below or at the number of degrees above stated. Another part of my invention consists in the use and application of a current of some suitable and not deleterious gas to propel the alcoholic or spirituous vapors and drive them from the still, instead of using heat. The gas is introduced into the still through a pipe, and expels the alcoholic or other vapors by pressure and mechanical action in the following manner: The pipe is carried perpendicularly from the top of the still to any desired height greater than a column of water at the natural pressure of the atmosphere. It is then bent downward and extended in that direction to the condenser, and by means of a similar pipe between the condenser and the still the circuit is made complete; the purpose of extending the perpendicular pipe to the height indicated being also to return any aqueous vapors that may arise directly to the still. It is not necessary to illustrate the same by drawings, because the form and use of such pipes between the still and condenser, and the maintaining of a circulating current thereby, are within the compass of the skill of any person conversant with the art.

Having thus described my invention, what I claim as new, and desire to secure by Letters Patent, is—

1. The treatment of wash or mash, or other substance from which alcohol or other spirits are to be distilled, with phosphate of lime or soda, or carbonate of ammonia.

2. The distillation of spirituous solutions, at a temperature not exceeding 176° Fahrenheit, for the purpose of preventing the formation of acetous and acetic acid, and also the different ethers.

3. Having, in connection with the still or other apparatus, a pipe longer or higher than the column of water at the natural pressure of the atmosphere, for the purpose of returning any aqueous vapors to the still.

4. The use of a current of suitable gas to propel the alcoholic vapors, instead of using heat.

5. The use of a circulating current of air, or suitable gas, between the condenser and the still for the purpose of preventing oxidation during the process, substantially as and for the purposes described and set forth.

In testimony whereof I have hereunto set my signature.

JOHN F. COLLINS.

Witnesses:
    A. NEILL,
    E. PLANTA.